United States Patent [19]
Bors et al.

[11] Patent Number: 5,733,655
[45] Date of Patent: Mar. 31, 1998

[54] THERMOSTRUCTURAL COMPOSITE ARTICLES AND METHOD FOR MAKING SAME

[75] Inventors: Susan Lydia Bors, Wilmington, Del.; Albert Zaki Fresco, Chadds Ford, Pa.; Mark Henry Headinger, Hockessin, Del.

[73] Assignee: Du Pont Lanxide Composites, L.P., Newark, Del.

[21] Appl. No.: 519,861

[22] Filed: Aug. 25, 1995

Related U.S. Application Data

[63] Continuation of Ser. No. 3,077, Jan. 11, 1993, abandoned.
[51] Int. Cl.⁶ .......................... C04B 35/56; C04B 35/76; C03C 10/06; C03C 14/00
[52] U.S. Cl. .......................... 428/397; 428/212; 428/245; 428/336; 428/366; 428/367; 428/378; 428/380; 428/384; 428/408; 428/688; 428/689; 428/698
[58] Field of Search ........................ 428/212, 245, 428/336, 366, 367, 578, 380, 384, 408, 688, 689, 699, 397; 501/94, 95, 97; 425/208, 368, 378, 408; 264/60

[56] References Cited

U.S. PATENT DOCUMENTS

| | | | |
|---|---|---|---|
| 4,610,917 | 9/1986 | Yamamura et al. | 428/224 |
| 4,752,503 | 6/1988 | Thebault | 427/248.1 |
| 4,778,722 | 10/1988 | Yamamura et al. | 428/367 |
| 4,823,734 | 4/1989 | Christin | 118/719 |
| 4,837,230 | 6/1989 | Chen et al. | 501/88 |
| 5,026,604 | 6/1991 | Thebault | 428/367 |
| 5,071,679 | 12/1991 | Heraud et al. | 427/264 |
| 5,094,901 | 3/1992 | Gray | 428/141 |
| 5,134,020 | 7/1992 | Cotteret et al. | 428/212 |

OTHER PUBLICATIONS

Takemi Yamamura et al., Characteristics of a Ceramic Matrix Composite using a Continuous Si–Ti–C–O Fiber, *Ceramic Engineering and Science Proceedings*, 11, 1648–1660, (1990) Sept./Oct.

*Primary Examiner*—Patrick Ryan
*Assistant Examiner*—Rich Weisberger

[57] ABSTRACT

A thermostructural composite article and a method for making in which the article comprises silicon carbide reinforcing fibers having an oxygen content by weight of not more than about 14% and an average diameter of less than about 20 microns in a refractory matrix at least partially formed by chemical vapor infiltration. The fibers in the composite article of the invention have an end-to-end fiber diameter uniformity ratio of less than about 1.5.

10 Claims, 3 Drawing Sheets

THERMOSTRUCTURAL COMPOSITE ARTICLES AND METHOD FOR MAKING SAME

This is a continuation of application Ser. No. 08/003,077 filed Jan. 11, 1993, now abandoned.

FIELD OF THE INVENTION

This invention relates to thermostructural composite articles and to methods of fabricating such articles.

BACKGROUND OF THE INVENTION

In recent years, the demand has escalated for thermostructural composite articles, i.e., articles of composite materials which exhibit not only high strength but which also maintain their strength at elevated temperatures and/or in harsh (corrosive, oxidative, erosive) environments. One known type of thermostructural composite article comprises a refractory matrix reinforced with silicon carbide fiber such as the composites disclosed in U.S. Pat. Nos. 4,752,503 and 5,026,604.

Composites of a refractory material reinforced with silicon carbide fiber are typically made by fabricating a preform of the fiber and subsequently forming a matrix about the fibers in the fiber preform. A particularly desirable technique for forming the matrix uses a process referred to as chemical vapor infiltration (CVI) in which precursor gases are passed into and through the pores in the preform under conditions such that the desired matrix is deposited.

While shown refractory matrix/silicon carbide fiber reinforced composite articles of this type have very desirable properties, composite articles with increased strength and/or toughness are desired for some applications which require withstanding more severe conditions or to improve the margin of safety in existing applications.

SUMMARY OF THE INVENTION

The invention provides a thermostructural composite article and a method for making the article. The article comprises silicon carbide reinforcing fibers having an oxygen content by weight of not more than about 14% and an average diameter of less than about 20 microns in a refractory matrix at least partially formed by chemical vapor infiltration. The fibers in the composite article of the invention have an end-to-end fiber diameter uniformity ratio of less than about 1.5.

In accordance with a preferred form of the invention, the matrix is selected from the class consisting of carbides, nitrides, oxides, and carbon. Preferably, the matrix is selected from the class consisting of SiC, HfC, $Si_3N_4$, BN, $Al_2O_3$, $ZrO_2$, $Ta_2O_5$, $TiO_2$ $HfB_2$ and pyrolitic carbon and most preferably comprises SiC.

In accordance with another preferred form of the invention, the thermostructural composite article further includes at least one interfacial layer of a refractory material between the fibers and the matrix, the layer adhering to the fibers and the matrix and being capable of elastic deformation in shear. Preferably, the interfacial layer is selected from the class consisting of pyrolitic carbon, carbides, nitrides, and oxides.

In accordance with another preferred form of the invention, the fibers are exposed to chemical treatment prior to formation of the matrix. Preferably, the chemical treatment includes the step of contacting the fibers with a hydrofluoric acid solution.

In accordance with another preferred form of the invention, fibers of the composite article include an oxygen-scavenging sealant forming region provided by a discontinuous particulate material containing a $B_2O_3$ glass precursor.

In accordance with another preferred form of the invention, at least a portion of the matrix of the composite article is formed by in situ reaction of a matrix precursor.

In accordance with another preferred form of the invention, an external protective coating of a refractory material is provided on the composite article.

The invention provides a refractory matrix/silicon carbide fiber reinforced composite with improved mechanical properties including tensile strength and breaking elongation. The improvements are realized over a wide range of temperatures.

DETAILED DESCRIPTION

Figure 1:
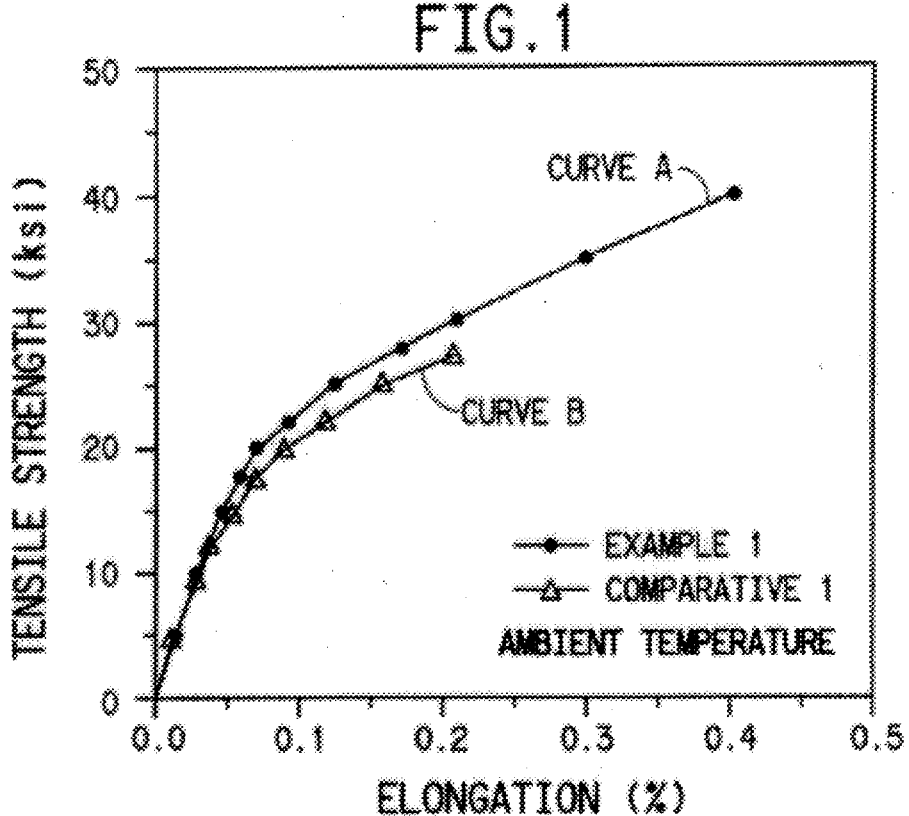
FIG. 1, Curve A, is graphical representation of tensile stress plotted against elongation at ambient temperature for a composite in accordance with the invention prepared as described in Example 1; Curve B represents the same behavior for a comparative composite (Comparative 1)

The silicon carbide reinforcing fibers used in accordance with the invention are of the type which have an oxygen content by weight of not more than about 14% and an average diameter of less than about 20 microns. In addition, the fibers have an end-to-end fiber diameter uniformity ratio of less than about 1.5. An end-to-end fiber diameter uniformity ratio of less than about 1.5 means that the ratio of the diameter of the largest fiber to the diameter of the smallest fiber when the fibers are viewed in cross-sectional optical micrographs is less than about 1.5. It will be understood that the term silicon carbide reinforcing fiber is not intended to exclude the presence of other elements in addition to oxygen. Preferably, the silicon carbide fiber has a titanium content by weight of about 0.1 to about 5%. Silicon carbide fibers of this type are commercially available under the trademark LOX-M TYRANNO from Ube Industries Ltd., Ube, Japan. It should also be noted that silicon carbide fibers are commercially available which have higher oxygen contents such as that sold under the TYRANNO trademark by Ube Industries.

In accordance with the method of the invention, the thermostructural composite article is made by fabrication of a reinforcing preform of the silicon carbide fibers prior to the formation of the matrix by chemical vapor infiltration (CVI). A typical fiberous preform has a nominal fiber volume of 25–50% of silicon carbide fibers. The fibers are arranged in bundles or tows, typically containing 200, 400, 800, or 1600 fibers or filaments. The fiber tows can be woven into a fabric of various weave architectures, such as plain-weave, 5 or 8 harness-satin weaves, or angle-interlock 3D weaves. Next, one or more layers of fabric are assembled, usually in a stacking arrangement, to form a fiberous preform that has a nominal fiber volume of 25–50%, with the balance being voids. As an alternative to weaving, braiding or filament winding techniques can be used to produce a 2D, 3D or 4D preform architecture.

A tool, such as one made of graphite or other material that does not adversely effect further processing, can be employed to help maintain the shape of the fiberous preform for subsequent processing steps. A dimensional stabilizing resin, such as poly-methyl-methacrylate or phenolic, can be utilized to rigidize the preform in preparation for subsequent processing.

If desired, the fibers are advantageously exposed to chemical treatment prior to formation of the matrix. Preferably, the chemical treatment includes the step of contacting the fibers with a hydrofluoric acid solution. The techniques described in U.S. Pat. No. 5,071,679 are useful for this purpose.

While not required for all applications, it is preferable to apply one or more interfacial layers around the fibers to improve the mechanical properties of the composite article. The interfacial layer is a refractory material which adheres to the fibers and the matrix and which is capable of elastic deformation in shear. Preferably, the interfacial layer is selected from the class consisting of pyrolitic carbon, carbides, nitrides, and oxides. Usually, the material of the interfacial layer is different from one or both of the matrix and fiber. The interfacial layer is preferably applied by CVI using known techniques such as those disclosed in U.S. Pat. Nos. 4,752,503 and 5,026,604. For example, CVI processing can be used to form a pyrolytic carbon interfacial layer around fibers. The formation of a pyrolytic carbon layer can be accomplished by passing a carbon containing gas (methane, propane, propylene, butane, pentane, hexane etc.) over the preform at elevated temperature (~1000° C.) and reduced pressure. Under these conditions, the carbon containing gas diffuses into the preform and deposits a thin layer of solid pyrolytic carbon on the surfaces of the fibers.

The process conditions in the CVI process can be varied and the length of the infiltration time can be controlled to produce the desired coating thickness. Desirable coating thicknesses range from 40 nanometers (nm) to 1000 nm (1 micron), and the preferable range is between 60 nm and 300 nm.

It is advantageous for some applications to include an oxygen-scavenging sealant forming region provided by a discontinuous particulate material containing a $B_2O_3$ glass precursor on the fibers of the composite article. This region can be formed before or after the formation of the interfacial layer and can improve the resistance of the composite to oxidation. The techniques disclosed in U.S. Pat. No. 5,094,901 are useful for this purpose.

After the formation of the interfacial layer and/or oxygen scavenging region if desired, a refractory matrix is formed about the reinforcing fibers. The refractory matrix is at least partially formed by chemical vapor infiltration (CVI). The refractory matrix is preferably selected from the class consisting of carbides, nitrides, oxides, and carbon. More preferably, the matrix is selected from the class consisting of SiC, HfC, $Si_3N_4$, BN, $Al_2O_3$, $ZrO_2$, $Ta_2O_5$, $TiO_2$ $HfB_2$ and pyrolitic carbon and most preferably comprises SiC. It will be understood that the preferred matrix materials may be the pure compositions represented by the chemical formulas above or may be modified to include minor quantities of other elements.

Known techniques for CVI can be used to form the matrix. An isothermal CVI process is preferred but a forced-flow CVI process could also be used. In the preferred embodiment of the invention in which the matrix is SiC, CVI can be carried out by passing appropriate precursor gases, such as methyl-trichloro-silane (MTS) or dimethyl-dichloro-silane (DDS) or a combination of silane and a hydrocarbon gas, e.g. methane, propane, propylene over the preform. A particularly suitable CVI process and equipment for depositing SiC is described in U.S. Pat. No. 4,823,734. The matrix can be applied using a CVI process which includes two or more discrete steps or in a single step process in which is continuous over an extended period of time. Although residual porosity in the final composite article is not mandatory, it is usually desirable to leave some residual porosity in the final composite, typically 5 to 20%, to reduce brittle behavior. If desired, machining can be employed at some point in the formation of the matrix to refine the shape the composite article or to remove a surface seal coating for further processing.

For some applications, it is desirable to form at least a portion of the matrix by in situ reaction of a matrix precursor either before or after the use of CVI. Such resin precursors and techniques for their use are known. For example, polycarbosilane or phenolic resin can be used to form SiC and carbon matrices, respectively, by heating the preform coated with the resins at temperatures above the decomposition temperature of the resins.

Optionally, additional processing can be employed to apply additional coatings to the composite article after matrix formation to enhance the performance in oxidizing, corrosive, erosive or other harsh environments. Chemical vapor deposition (CVD) is a known technique which can be used to apply coatings of this type.

The enhanced strength of the composite articles in accordance with the invention offers increased thermomechanical performance in use and, due to the improved elongation, also provides better margins of safety similar to the effect provided by the plasticizing of metals.

The invention is illustrated in the following Examples which are not intended to be limiting.

EXAMPLE 1 and COMPARATIVES

To fabricate a composite article in accordance with the invention (Example 1 Composite), a 800 filament silicon carbide fiber tow, sold under the trademark LOX-M TYRANNO by Ube Industries, Ltd., Japan, is woven into a balanced plain-weave fabric. Layers of the fabric are cut and stacked into a preform with fibers orientated in two dimensions within the plane. The stacked layers of fabric are compacted to obtain a fiber volume of forty percent, nominal, in the preform. In this example, eight plys are used to produce a plate geometry with a two millimeter thickness and a forty percent fiber volume, nominal.

The nominal forty percent fiber volume is chosen so that the volume of reinforcing fibers in the final composite article would be directly comparable in evaluation to thermomechanical properties of known composites made with a forty percent by volume of silicon carbide fibers sold under the trademark NICALON 202 by Nippon Carbon Co., Japan. Table 1 below shows that the tensile properties of LOX-M TYRANNO silicon carbide fibers as reported by the producer are very similar to those for NICALON 202 silicon carbide fibers. Silicon carbide fibers reported as having twenty-five weight percent oxygen content are also sold by Ube Industries as standard grade (Grade D) TYRANNO by trademark and the properties of this fiber are also included in Table 1 for comparative purposes.

TABLE 1

|  | Units | LOX-M TYRANNO Fiber | NICALON 202 Fiber | TYRANNO Fiber |
| --- | --- | --- | --- | --- |
| Composition |  | Si—Ti—C—O | Si—C—O | Si—Ti—C—O |
| Oxygen Content | wt % | 10–14 | 12–14 | ~25 |
| Diameter | microns | 11 | 15 | 8.5 |
| Tensile Strength | ksi (GPa) | 470 (3.3) | 430 (3.0) | 470 (3.3) |
| Tensile Modulus | Msi (GPa) | 27 (190) | 28 (195) | 26 (180) |

A thin pyrolytic carbon (~0.1 microns) interfacial layer is applied to the fibers of the preform using a chemical vapor infiltration process of the type described in U.S. Pat. No. 4,752,503.

A SiC matrix is formed on fiber of the preform using chemical vapor infiltration process of the type described in U.S. Pat. No. 4,752,503 using apparatus as disclosed in U.S. Pat. 4,823,734. SiC is formed between the coated fibers until a final porosity of 5–20% is achieved in the composite article. The resulting composite articles have final bulk densities of 2.2 to 2.6 g/cc.

For in-plane tensile tests, coupons are machined from the articles parallel to one of the two directions of fibers. (Testing in one direction in-plane is equivalent to the other direction because the plain-weave fabric is balanced.) For the purposes of comparison, the procedures described above are repeated using silicon carbide fiber sold under the trademark NICALON 202 and using silicon-carbide fiber sold under the trademark TYRANNO, standard grade (Grade D), to produce comparative composite article coupons. Comparative Composite 1 denotes composite article coupons made with NICALON 202 reinforcing fibers and Comparative Composite 2 denotes composite article coupons made with standard grade TYRANNO reinforcing fibers.

FIG. 1 illustrates the behavior of the Example 1 Composite article coupons (Curve A) under tensile loading at ambient temperature in terms of the pulling force (tensile stress) and the measured elongation. The second curve B is also shown in FIG. 1 that represents the tensile behavior of the Comparative 1 Composite article coupons. As illustrated in FIG. 1 and as listed in Table 2 below, it is found that the Example 1 Composite article coupons possess, on the average, a 57% increase in tensile strength and a 141% increase in elongation in comparison with the Comparative 1 Composite coupons. In comparison with Comparative 2 Composite articles that are reinforced with standard-grade TYRANNO fibers, the composite articles made with LOX-M TYRANNO fibers possess significantly higher tensile strengths and elongations even though the fiber strengths are equivalent.

TABLE 2

|  | Units | Example 1 Composite | Comparative 1 Composite | Comparative 2 Composite |
| --- | --- | --- | --- | --- |
| Tensile Strength | ksi (MPa) | 44 (305) | 28 (195) | 37 (255) |
| Tensile Elongation | % | 0.53 | 0.22 | 0.36 |
| Tensile Modulus | Msi (GPa) | 32 (220) | 31 (215) | 30 (205) |

Figure 2:
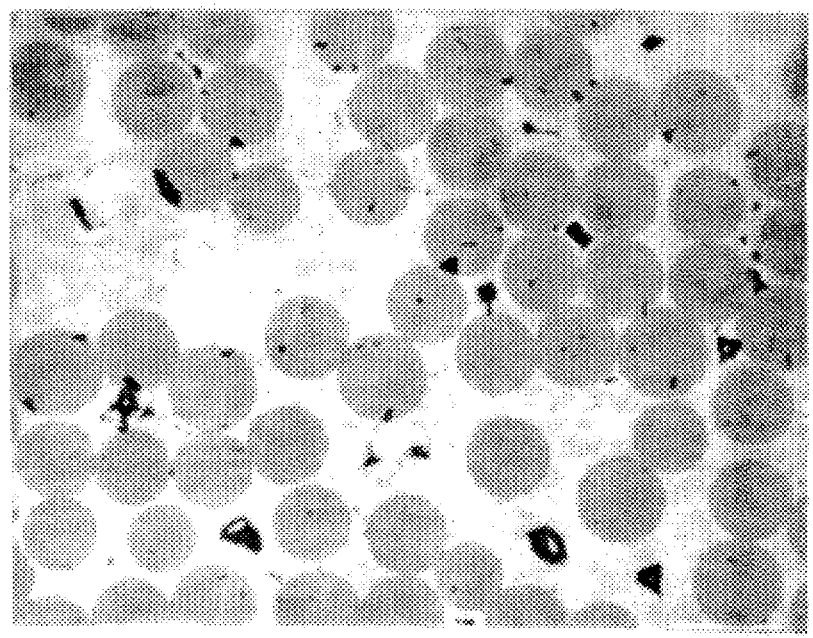
FIG. 2 is an optical micrographs at 1000X of a polished cross-section of the composite in accordance with the invention prepared in accordance with the procedures of Example 1 from which the end-to-end fiber uniformity ratio can be measured.
Figure 3:
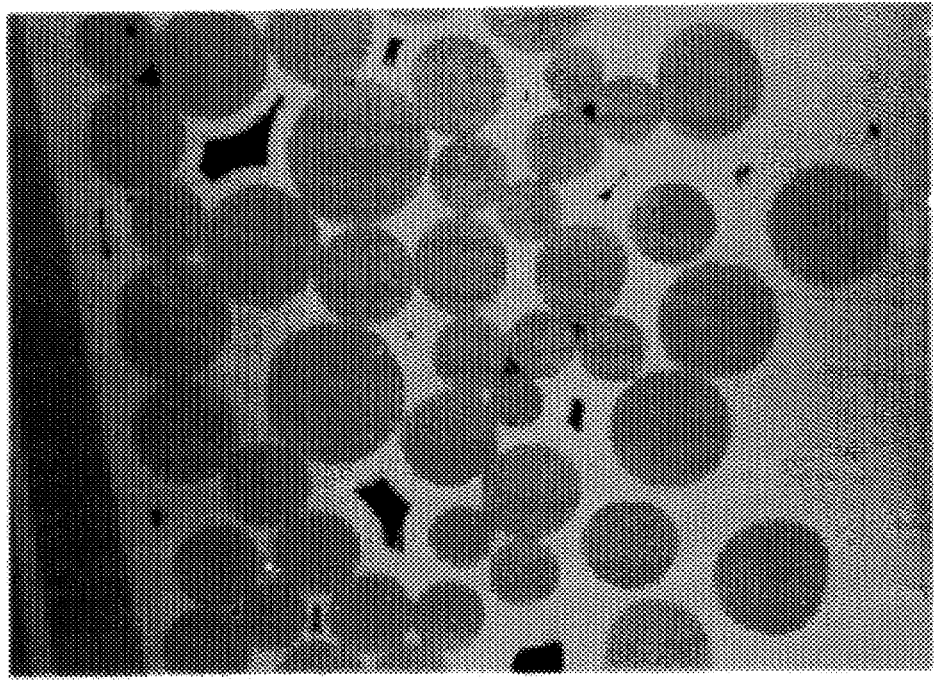
FIG. 3 is an optical micrograph as in FIG. 2 of a comparative composite (Comparative 1)
Figure 4:
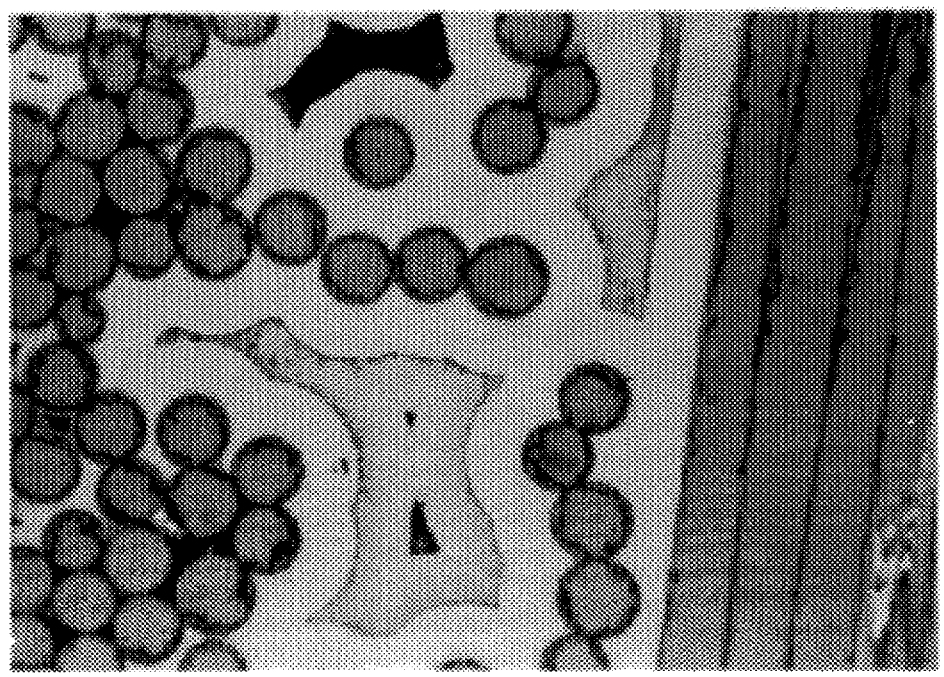
FIG. 4 is an optical micrograph as in FIG. 2 of a comparative composite (Comparative 2)

The end-to-end fiber diameter uniformity ratio of less than about 1.5 in the silicon carbide fibers used in a composite in accordance with the invention is observed in optical micrographs. FIG. 2 is an optical micrograph at 1000X magnification of a polished cross-section of the composite of the invention from which the end-to-end fiber uniformity ratio can be measured. Using a ruler on the micrograph of FIG. 2, measuring the largest fiber diameter and the smallest fiber diameter results in an end-to-end fiber uniformity ratio of about 1.2. FIG. 3, on the other hand, is a similar optical micrograph of Comparative 1 composite article which shows that the end-to-end fiber uniformity ratio of the comparative composite is about three. FIG. 4 is a similar optical micrograph of the Comparative 2 composite article that has been etched. FIG. 4 shows that the end-to-end fiber uniformity ratio is 1.8.

EXAMPLE 2

To prepare another composite article in accordance with the invention (Example 2 Composite), the same fiber and procedures as in Example 1 are used except that the tow contains 400 filaments per fiber tow. Due to the decreased number of fibers in the tow, 22 plys of the balanced plain-weave fabric were used to make the three millimeter thick preform, again with a forty percent, nominal fiber volume.

Tensile testing was done as in Example 1. At ambient temperature, the tensile behaviour of Example 2 composite coupons is similar to that observed for Example 1 composite coupons, illustrated in FIG. 1. The tensile test results for Example 2 composite and Comparative 1 composite articles (from Example 1) are summarized in Table 3.

TABLE 3

|  | Units | Comparative 1 Composite | Example 2 Composite |
| --- | --- | --- | --- |
| Test Temperature | °C. | 23 | 23 |
| Tensile Strength | ksi (MPa) | 28 (195) | 41 (285) |
| Tensile Elongation | % | 0.22 | 0.42 |
| Tensile Modulus | Msi (GPa) | 31 (215) | 34 (235) |
| Test Temperature | °C. | 1000 | 1000 |
| Tensile Strength | ksi (MPa) | 33 (225) | 44 (305) |
| Test Temperature | °C. | 1200 | 1200 |
| Tensile Strength | ksi (MPa) | 34 (235) | 46 (315) |

Figure 5:
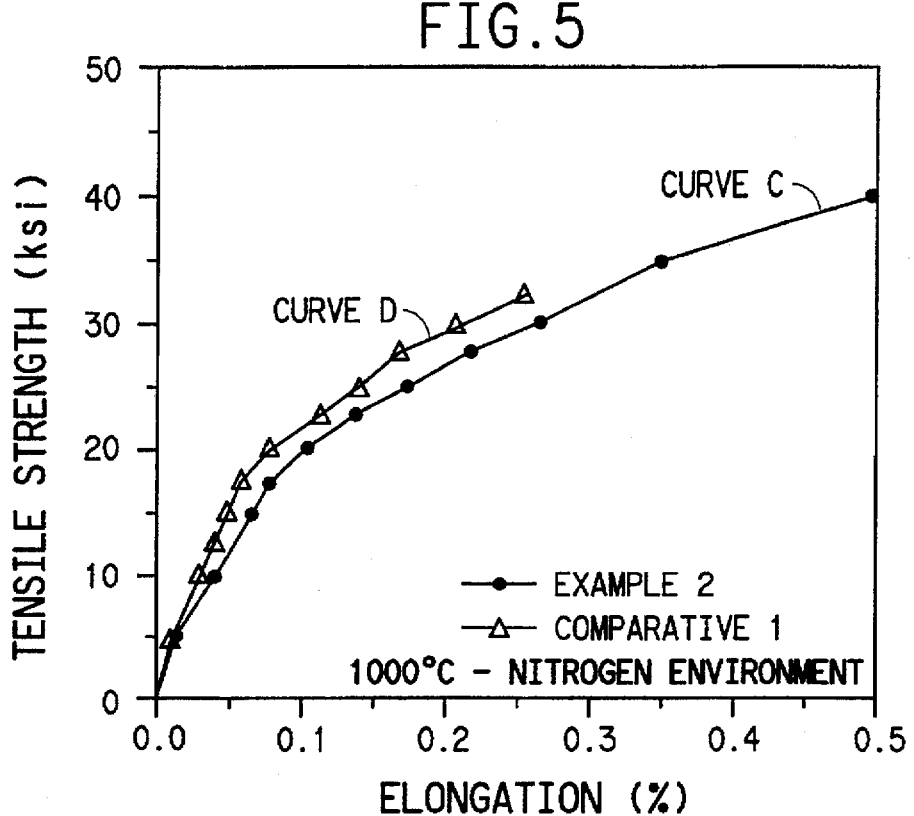
FIG. 5, Curve C, is graphical representation of tensile stress plotted against elongation at 1000° C. in nitrogen for a composite in accordance with the invention prepared as described in Example 2; Curve D represents the same behavior for a comparative composite (Comparative 1)
Figure 6:
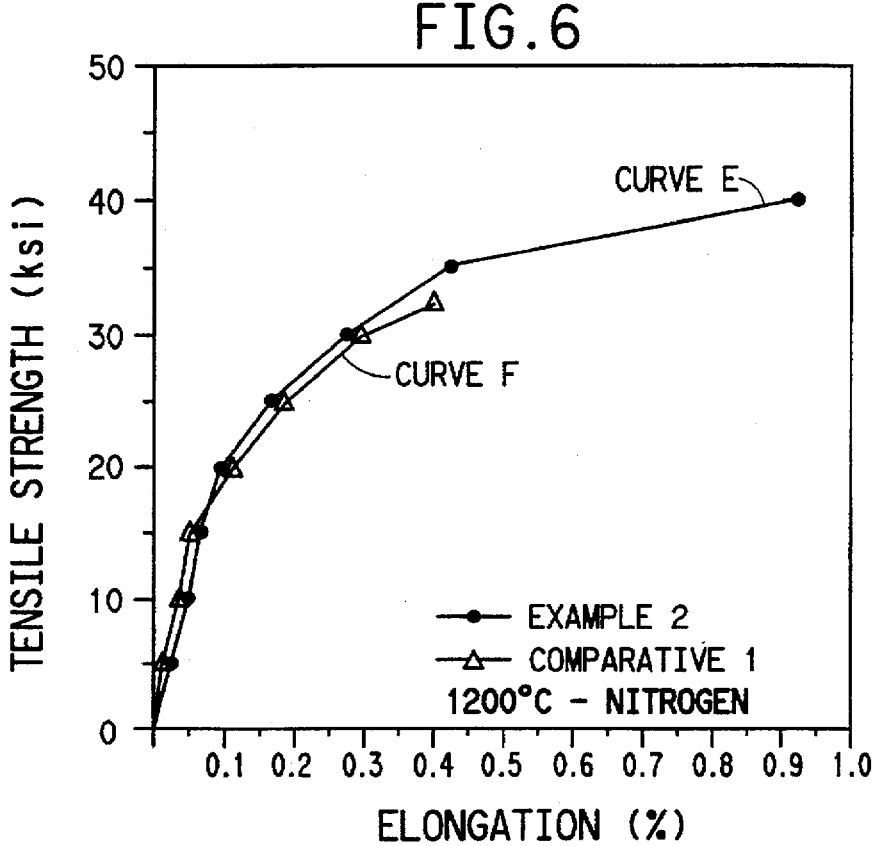
FIG. 6 is a graphical representation similar to FIG. 5 for the same composites at 1200° C. in nitrogen.

Additional in-plane tensile tests at elevated temperature in a nitrogen, non-oxidizing, environment were conducted on composite article coupons in accordance with the invention, and compared with Comparative 1 composite coupons. FIG. 5, Curve C (Example 2) and Curve D (Comparative 1), illustrates the results at 1000° C. which show that the improvement provided by the invention is retained at elevated temperatures. FIG. 6, Curve E, (Example 2) and Curve F (Comparative 1), shows similar comparative results for tensile tests at 1200° C. in a nitrogen environment. The tensile strengths are also reported in Table 3 above.

EXAMPLE 3

To prepare another composite article in accordance with the invention (Example 3 Composite), the same fiber and procedures as in Examples 1 and 2 are used except that the tow contains 800 filaments per fiber tow. 14 plys of the balanced plain-weave fabric were used to make the three millimeter thick preform, again with a forty percent, nominal fiber volume.

Tensile testing was done as in Example 1. At ambient temperature, the tensile behaviour of Example 3 composite coupons is similar to that observed for Example 1 composite coupons, illustrated in FIG. 1. The tensile test results for Example 3 composite articles and Comparative 1 composite articles (from Example 1) are summarized in Table 4.

TABLE 4

|  | Units | Comparative 1 Composite | Example 3 Composite |
|---|---|---|---|
| Test Temperature | °C. | 23 | 23 |
| Tensile Strength | ksi (MPa) | 28 (195) | 39 (270) |
| Tensile Elongation | % | 0.22 | 0.42 |
| Tensile Modulus | Msi (GPa) | 31 (215) | 34 (235) |

What is claimed is:

1. An improved thermostructural composite article comprising silicon carbide reinforcing fibers having an average diameter of less than about 20 microns, a refractory matrix about said fibers being at least partially formed by chemical vapor infiltration and an interfacial layer of a refractory material between said fibers and said matrix, said layer adhering to said fibers and said matrix and being capable of elastic deformation in shear, the improvement comprising a composite article wherein the fibers are characterized by an end-to-end fiber diameter uniformity ratio of less than or equal to 1.2 and an oxygen content by weight of not more than about 14% and wherein the tensile strength of the article is at least 44 kpsi (305 MPa).

2. The thermostructural composite article of claim 1 wherein said silicon carbide fiber has a titanium content by weight of about 0.1 to about 5%.

3. The thermostructural composite article of claim 1 wherein said matrix is selected from the class consisting of carbides, nitrides, oxides, and carbon.

4. The thermostructural composite article of claim 1 wherein said matrix is selected from the class consisting of SiC, HfC, $Si_3N_4$, BN, $Al_2O_3$, $ZrO_2$, $Ta_2O_5$, $TiO_2$ $HfB_2$ and pyroiltic carbon.

5. The thermostructural composite article of claim 1 wherein said matrix comprises SiC.

6. The thermostructural composite article of claim 1 wherein said interfacial layer is selected from the class consisting of pyrolitic carbon, carbides, nitrides, and oxides.

7. The thermostructural composite article of claim 1 wherein said fibers are exposed to chemical treatment prior to formation of the matrix wherein said chemical treatment comprises contacting the fibers with a hydrofluoric acid solution.

8. The thermostructural composite article of claim 1 wherein said fibers comprise an oxygen-scavenging sealant forming region provided by a discontinuous particulate material containing a $B_2O_3$ glass precursor.

9. The thermostructural composite article of claim 1 wherein at least a portion of said matrix is formed by in situ reaction of a matrix precursor.

10. The thermostructural composite article of claim 1 further comprising an external protective coating of a refractory material.

* * * * *